(12) United States Patent  
Lindstrom

(10) Patent No.: US 10,569,341 B2
(45) Date of Patent: Feb. 25, 2020

(54) CONTOURING HEAD

(71) Applicant: Conrad B. Lindstrom, Northville, MI (US)

(72) Inventor: Conrad B. Lindstrom, Northville, MI (US)

(73) Assignee: LINTECH, Walled Lake, MI (US)

(*) Notice: Subject to any disclaimer, the term of this patent is extended or adjusted under 35 U.S.C. 154(b) by 0 days.

(21) Appl. No.: 16/048,472

(22) Filed: Jul. 30, 2018

(65) Prior Publication Data
US 2020/0030890 A1 Jan. 30, 2020

(51) Int. Cl.
*B23B 41/00* (2006.01)
*B23B 29/034* (2006.01)
*B23B 3/26* (2006.01)

(52) U.S. Cl.
CPC ........ *B23B 29/03432* (2013.01); *B23B 41/00* (2013.01); *B23B 3/26* (2013.01)

(58) Field of Classification Search
CPC ... B23B 3/26; B23B 29/034; B23B 29/03435; B23B 29/03439; Y10T 408/858; Y10T 408/8598; Y10T 82/12; Y10T 82/125; Y10T 82/25121; Y10T 82/2529
See application file for complete search history.

(56) References Cited

U.S. PATENT DOCUMENTS

| | | | | |
|---|---|---|---|---|
| 4,411,178 A | * | 10/1983 | Wachs | B23B 5/162 82/113 |
| 4,487,275 A | * | 12/1984 | Froehlich | B23B 51/0045 175/170 |
| 4,611,958 A | * | 9/1986 | Vasilchenko | B23B 29/03446 408/147 |
| 4,778,315 A | * | 10/1988 | Duffy | B23Q 11/005 29/DIG. 78 |
| 5,316,417 A | * | 5/1994 | Romi | B23B 29/03446 408/153 |
| 5,520,077 A | | 5/1996 | Lindstrom | |
| 5,611,651 A | * | 3/1997 | Wohlhaupter | B23B 29/03403 408/143 |
| 5,993,121 A | * | 11/1999 | Fiesta | B23Q 11/1076 408/56 |
| 6,123,270 A | * | 9/2000 | Hara | B05B 7/02 239/422 |
| 6,128,985 A | * | 10/2000 | Muster | B23Q 1/5468 82/1.4 |
| 6,367,359 B1 | * | 4/2002 | Ropos | B23B 29/03467 82/1.4 |
| 7,331,585 B2 | | 2/2008 | Lindstrom | |
| 7,931,427 B1 | * | 4/2011 | McArthur | B23Q 11/1084 408/61 |
| 8,128,323 B2 | * | 3/2012 | Conroy | B23Q 5/046 408/61 |
| 9,162,291 B2 | * | 10/2015 | Wiest | B23B 29/0345 |

* cited by examiner

*Primary Examiner* — Nicole N Ramos
(74) *Attorney, Agent, or Firm* — Dickinson Wright PLLC

(57) ABSTRACT

A contouring head includes a sleeve and coaxially mounted spindle connected by means of a yoke to a slide mounted by first and second sets of roller bearings to and between a slide track and a pair of keeper plates which hold the slide to the slide plate and within a slide track formed therein. A yoke interconnects the spindle to the slide to convert axial motion of the spindle into radial motion of the slide. A tool mount in the form of a pot is connected to the slide to control the radial position of a single edged cutting tool. A cover is mounted on the keeper plates and slide plate.

18 Claims, 10 Drawing Sheets

CONTOURING HEAD

FIELD OF THE INVENTION

The invention disclosed herein is in the field of contouring heads for use in finishing contours of varying diameter in the preformed bore of a machinable part.

BACKGROUND OF THE INVENTION

The term "contouring head" as used herein, refers to an apparatus adapted for use in combination with a programmable drive system controlling the position of a single edge cutter such as a carbide insert to contour the interior diameter of a preformed bore in a metallic part. The head preferably includes a universal carrier called a "pot" adapted to receive the cutter which, in turn, is connected to a rotating spindle. The spindle and a surrounding sleeve may be connected to a numerical control system that can control the rotation of the sleeve and spindle as well as the depth and effective diameter of the cutting tool in the part.

A system generally conforming to this description is described in my issued U.S. Pat. No. 5,520,077 issued May 28, 1996; the system described herein is an improvement to the mechanism described in that patent.

SUMMARY OF THE INVENTION

The contouring apparatus described herein and used to control the longitudinal and radial positions of a rotating cutting tool relative to a longitudinal axis consists essentially of a sleeve and a spindle within the sleeve having a longitudinal axis of rotation and adapted for controlled bi-directional movement along said longitudinal axis so as to enter and move along the bore axis as described above. The apparatus further includes means for advancing and retracting the spindle relative to the sleeve to change the effective radius of the cutting tool relative the simple axis as the tool moves longitudinally through the part.

The apparatus comprises a slide plate which is mounted for rotation with the spindle and has a slide track formed therein and arranged perpendicular to the longitudinal axis of the spindle. A slide capable of carrying the tool is disposed in the slide track and is held in the track by a pair of keeper plates. Bearing means operating on both front and rear faces of the slide promote durability and provide for precise movement of the slide within the slide track.

In the preferred embodiment hereinafter described in detail, the bearings for the slide include a first set of roller bearings between the rear face of the slide and the slide track. I have found that linear, recirculating roller bearings are best suited for this location. I also provide a second set of bearings disposed between the keeper plates and the front face of the slide. In the preferred embodiment, these bearings are V-shaped to fit within grooves that are aligned with the direction of slide movement relative to the slide plate. I also provide means to adjust the tightness of the bearings to close tolerances.

To convert longitudinal movement of the spindle relative to the sleeve which surrounds the spindle and supports the contouring head into radial slide movement, a pivotal yoke is provided. In the preferred form hereinafter illustrated and described in detail the yoke comprises two triangular plates having a fixed pivot at one corner connected to an anchor plate, a pivotal connection at another corner to the spindle, and a third pivotal connection to the slide. The pivotal connections to the spindle and the slide connector are slotted to accommodate the radial motion of the slide as the yoke rotates; i.e., to provide "lost motion" connections.

Further details of the illustrative embodiment hereinafter described include an air hose which extends through and along the longitudinal axis of the spindle and the yoke to a pot which is mounted to the slide and which is adapted to receive and hold a cutting tool in conventional fashion. The air hose is adapted to be connected to an air source to blow chips out of the bore during a cutting-operation.

An additional feature of the apparatus hereinafter described is a cover with an oval aperture and a thin metal skirt adapted to be mounted over the slide keeper plates and in surrounding relationship to the slide plate.

BRIEF DESCRIPTION OF THE DRAWING

Further and additional features and advantageous of the invention will become apparent from a reading of the following description of an illustrative embodiment which is to be taken in combination to the accompanying drawings of which.

Figure 1:
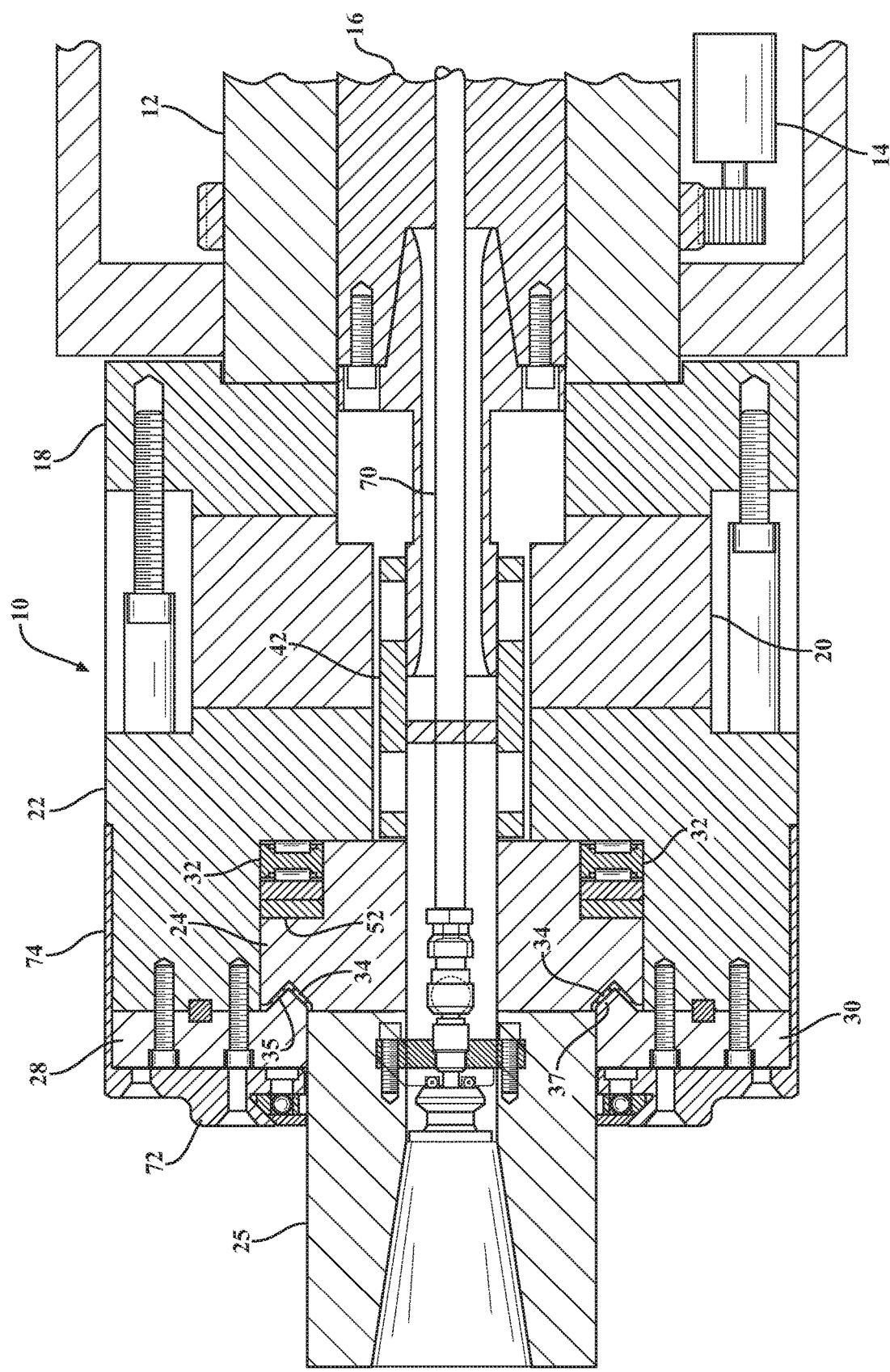
FIG. 1 is a top sectional view of the contouring head 10.

Except for gaps, the drawings of FIGS. 1-10 are to scale; for reference purposes, the thickness of the yoke plates 42 shown in FIG. 1 is about 0.8 inches. Gaps between parts are exaggerated.

DETAILED DESCRIPTION OF THE ILLUSTRATIVE EMBODIMENT

FIG. 1 shows a top sectional view a contouring head 10, which is mounted for rotation with a sleeve 12, which is rotated by drive means 14. The sleeve has a longitudinal axis of rotation that, in a contouring operation, corresponds to the axis of the bore being contoured. Coaxially disposed within the sleeve 12 is spindle 16. Both the sleeve 12 and the spindle 16 are adapted to be connected to a numerical control system (not shown) capable of rotating the sleeve 12 and the spindle 16 about the common longitudinal axis, and advancing the sleeve 12 along the axis so as to cause a tool carried by the head 10 to enter and move within a performed bore in a part to be finished. In addition, the numerical control system is capable of advancing and retracting the spindle 16 relative to the sleeve 12 to vary the cutting radius of the tool carried by the contouring head 10, as hereinafter described.

Figure 11A:
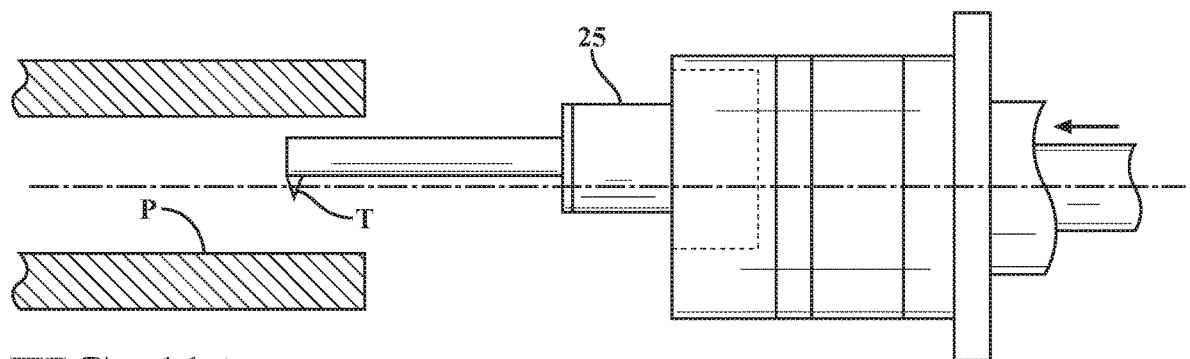
FIGS. 11A-11C are diagrammatic views of an edge cutting tool in minimum, medium, and maximum material removal positions, and corresponding to the slide positions shown in FIGS. 2, 3, and 4, respectively.
Figure 11B:
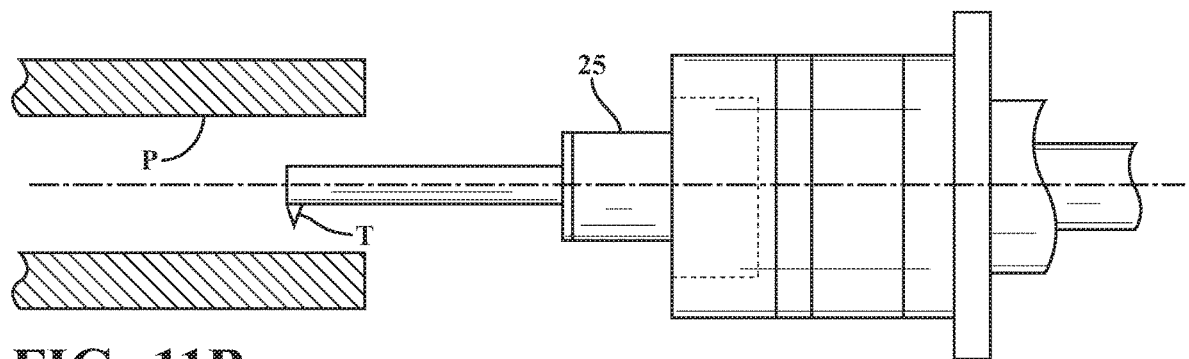

The contouring head 10 shown in FIGS. 1-4 comprises a plate 18 that connects the head to the sleeve 12 for rotation therewith. Plate 18 is connected by bolts to intermediate plate 20 shown in FIG. 5 to have a cylindrical shape with a center aperture to allow space for spindle 16 and other components to be described. A slide plate 22 is bolted through the plate 20 to the plate 18. The slide plate 22 has formed therein a slide track 23 best shown in FIG. 6 to receive therein a slide 24 which carries a "pot" 25 into which an edge type cutting tool T can be mounted as shown in FIG. 11. The slide track 23 extends at right angles to the axis of the spindle 16.

Figure 9:
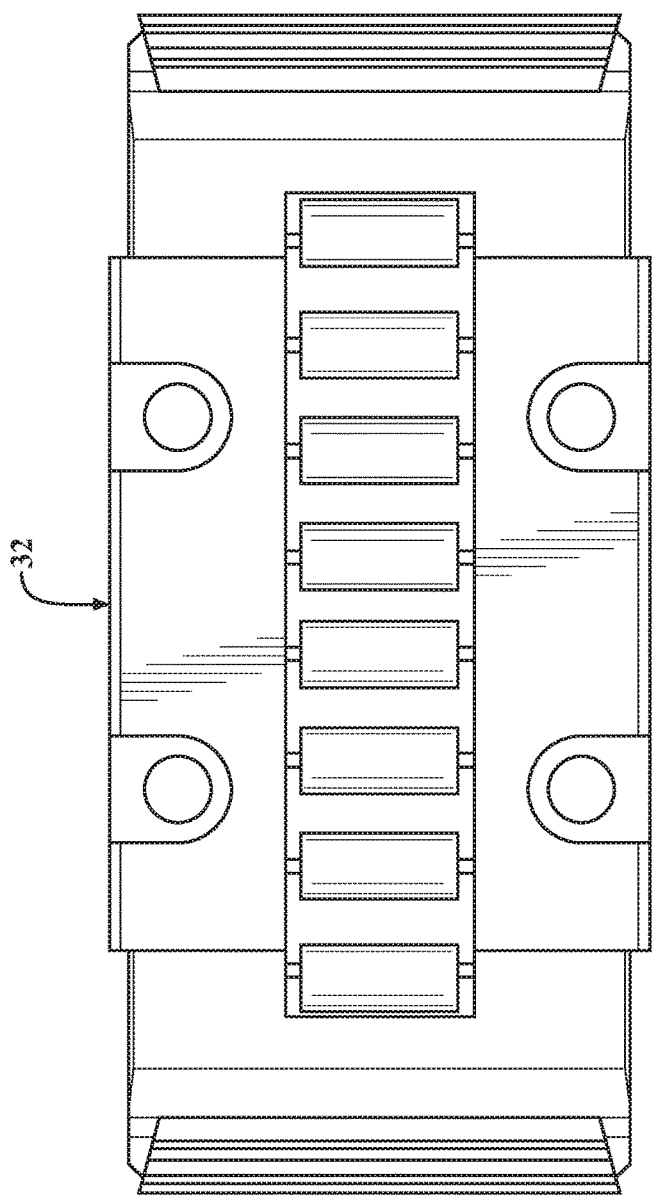
FIG. 9 is a top view of a roller bearing used in the head between the slide and the slide plate.
Figure 10:
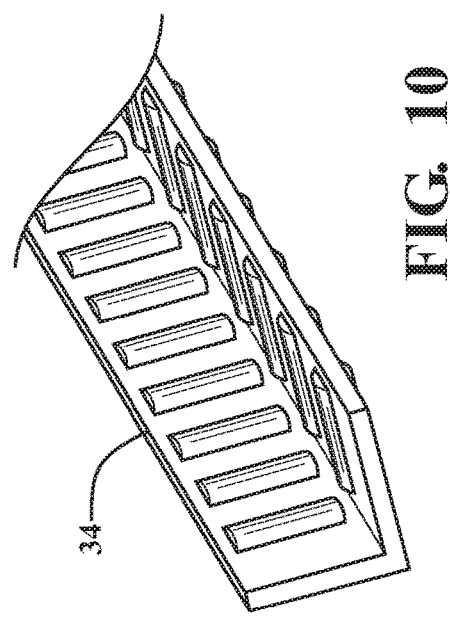
FIG. 10 is a partial perspective view of a recirculating roller bearing used between the slide face and a keeper plate.

The slide 24 is held in the slide track 23 by means of a pair of keeper plates 28 and 30 which are bolted to the slide plate 22 and bear upon a grooved face of the slide 24. A first set of four bearings 32 is located between recesses in the rear face on slide 24; i.e., the face shown to the right in the drawings of FIGS. 1-4, and the slide track 23 of the slide plate 22. The bearings 32 are quadrilaterally arranged and are preferably in linear recirculating roller bearings, series RUS 19069 as shown in FIG. 9. A second set of roller bearings 34 is mounted between a set of V-shaped grooves 35 in the front face of slide 24 and a corresponding set of V-shaped projections 37 in the keeper plates 28 and 30 as best shown in FIG. 1. Between the two sets of bearings 32, 34 precise and free movement of the slide 24 in the slide track 23 is accomplished. Wedges 52 are mounted in reversed fashion between the bearings 32 and a recessed face of the slide to adjust the tension in the bearing system that allows the slide 24 to be freely and precisely moved radially within the slide track 23 under control of the axial movement of the spindle 16 as hereinafter described.

The aforesaid radial movement of the slide 24 is achieved by means of a yoke 42 which comprises a pair of parallel triangular plates which are pivotally connected at connection 47 to plate 20. A second pivotal connection 48 is provided between a corner of the yoke plates 42 and a spindle/yoke connector 44. The yoke connector 44 includes a slot 54 at this position to provide a "lost motion" connection that permits sliding movement between the yoke and the connector 44 as the yoke rotates about the pivot 47. A third pivotal connection 49 connects the third corner of the triangular yoke plates to a connector extension 46 on the slide 24 by means of slot 68. This slot provides a second "lost motion" connection that allows longitudinal movement of spindle 16 to produce radial movement of slide 24 in the track 23 of slide plate 22. As hereinafter described, the radial position of slide 24 determines the radius of the finishing cut being made at any given time by the tool carried in the socket of pot 25 of conventional design.

Figure 2:
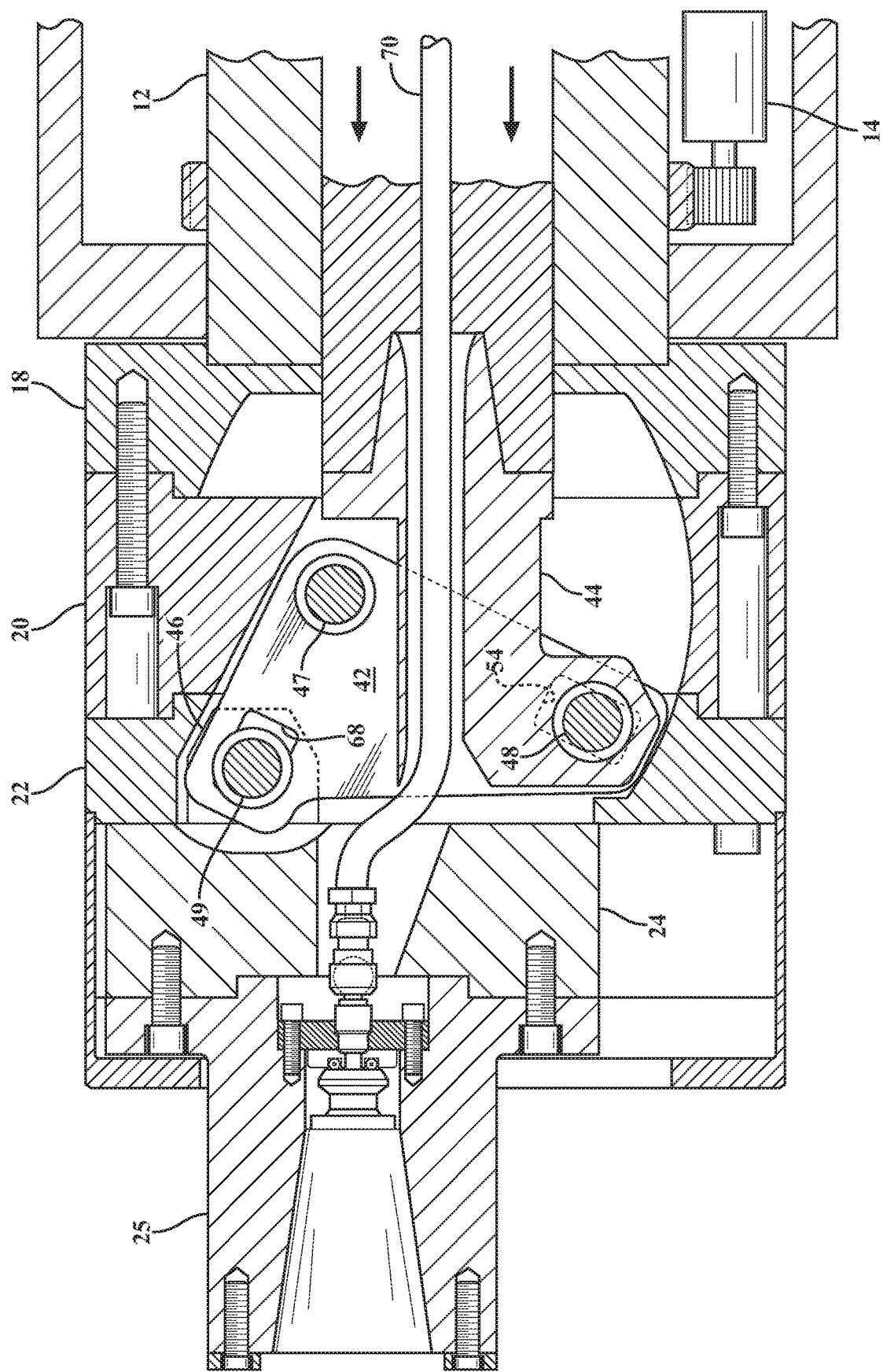
FIG. 2 is a side sectional view of the head in a minimum cut radius condition.

Looking first to FIG. 2, the spindle 16 is shown in the forwardmost position; i.e., moved to the left within sleeve 12 as shown in the figure, to rotate yoke 42 clockwise and place the slide 24 in the position that produces the smallest or "minimum" radial cut position of a tool carried by pot 25. This position corresponds to the position of tool T shown in FIG. 11A.

Figure 3:
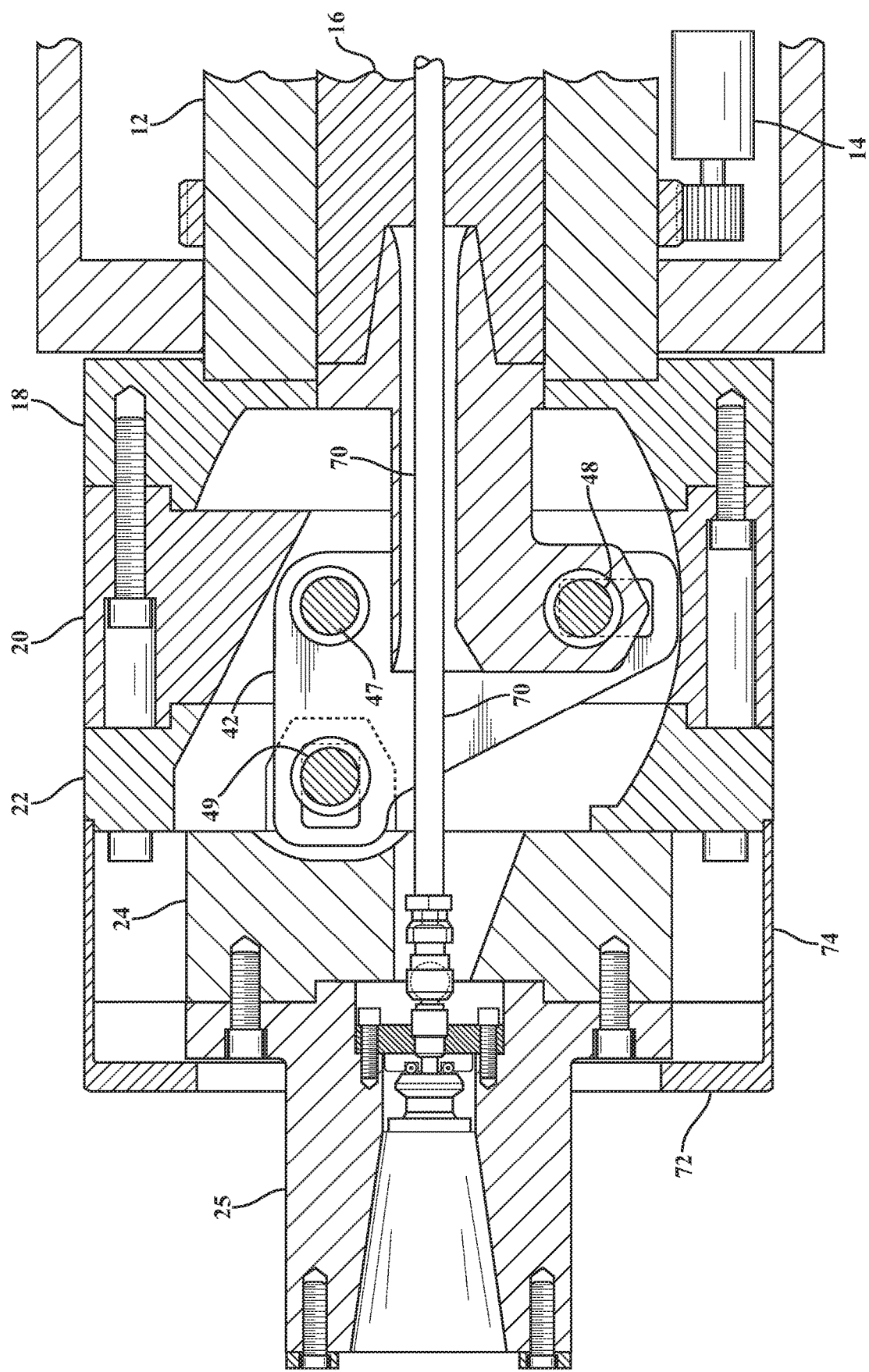
FIG. 3 is a side sectional view of the head with the slide in a medium cut radius condition.

FIG. 3 shows the spindle partly moved to the right to rotate the yoke 42 and move the slide 24 to a medium position such that the tool is more radially extended. This corresponds to FIG. 11B.

Figure 4:
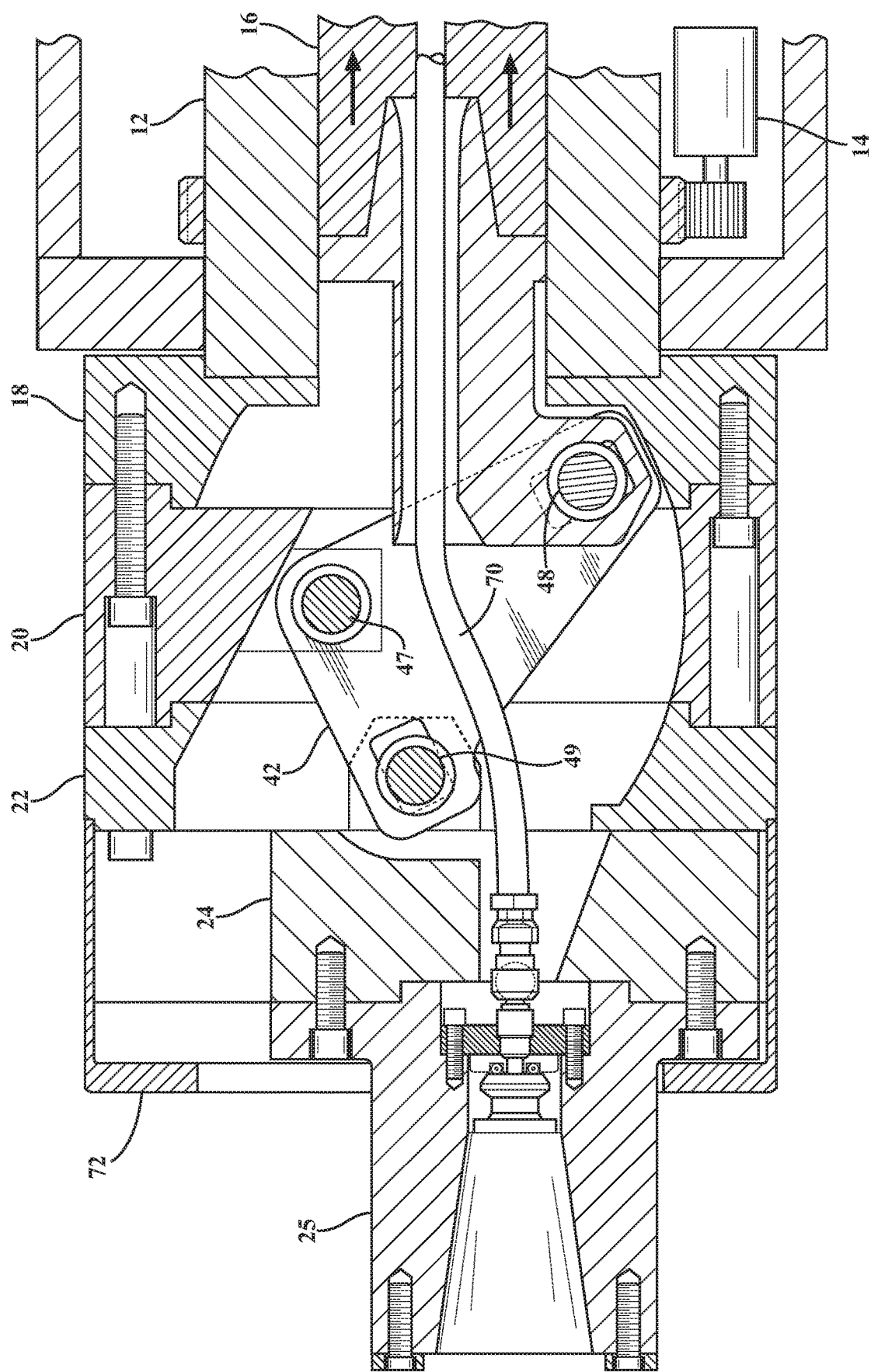
FIG. 4 is a side sectional view of the head with the slide in a maximum cut radius condition.
Figure 5:
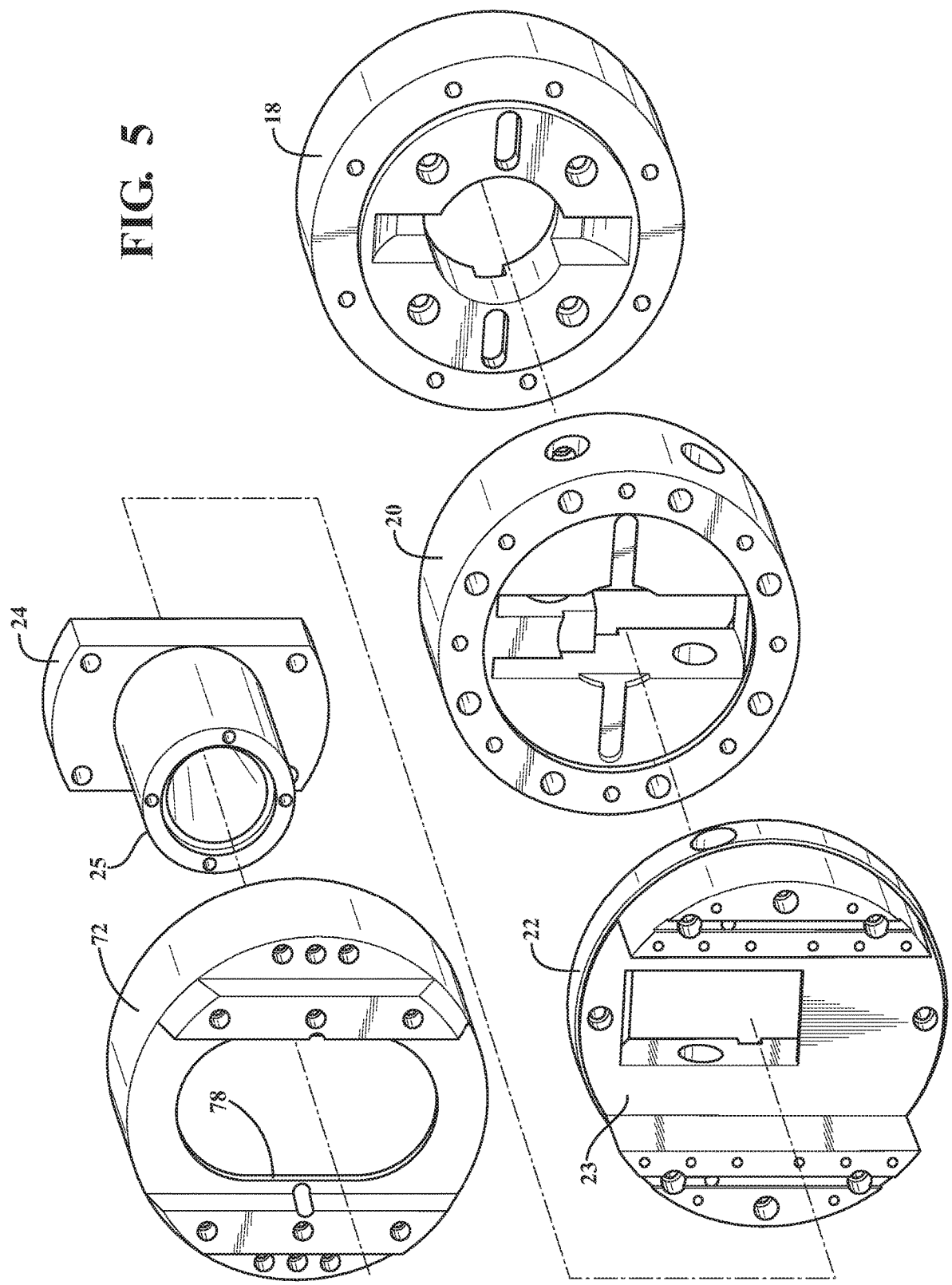
FIG. 5 is an exploded view of axially-arrayed major components of the head.
Figure 6:
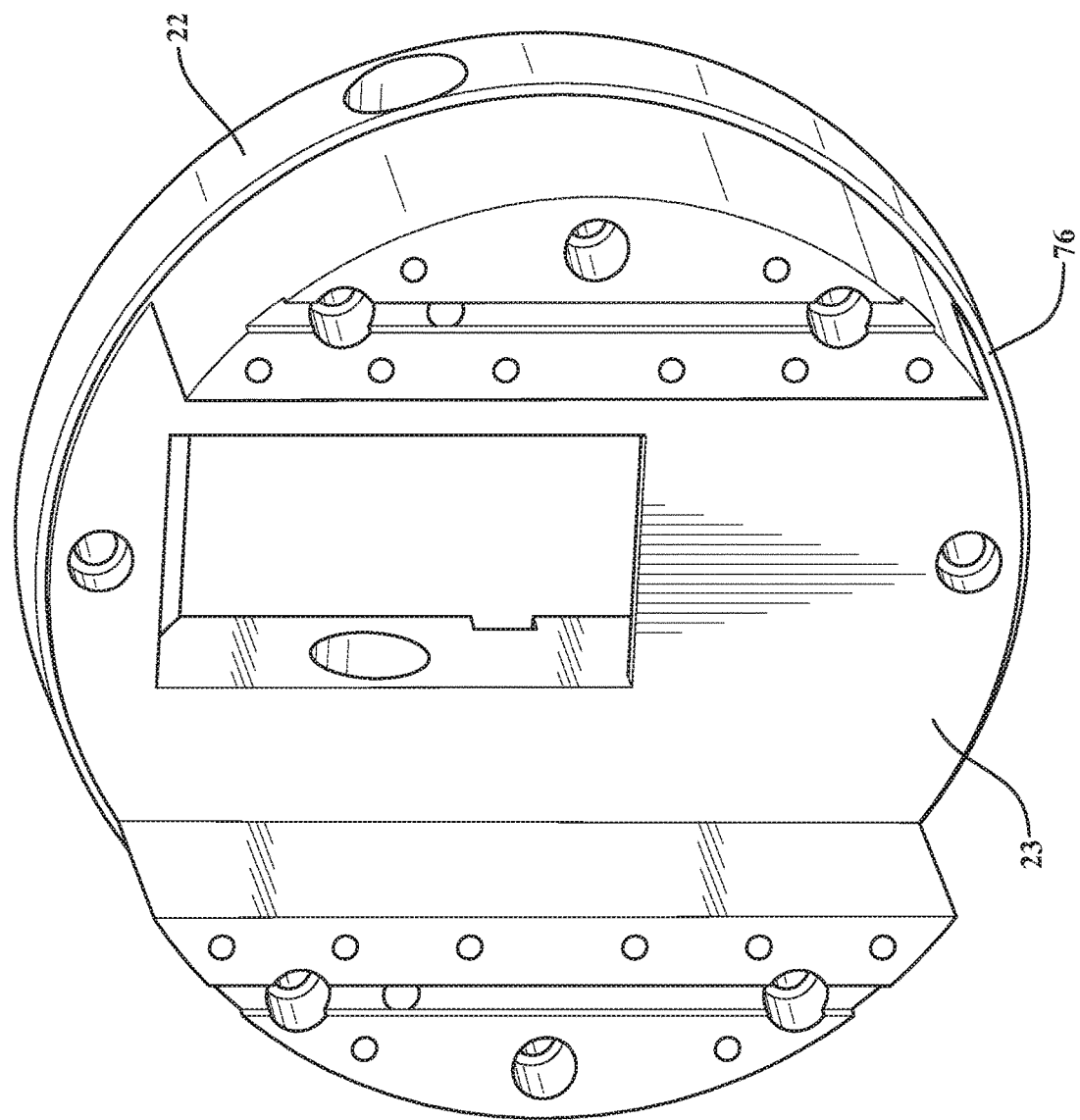
FIG. 6 is a perspective view of the slide plate in the exploded view of FIG. 5.
Figure 7:
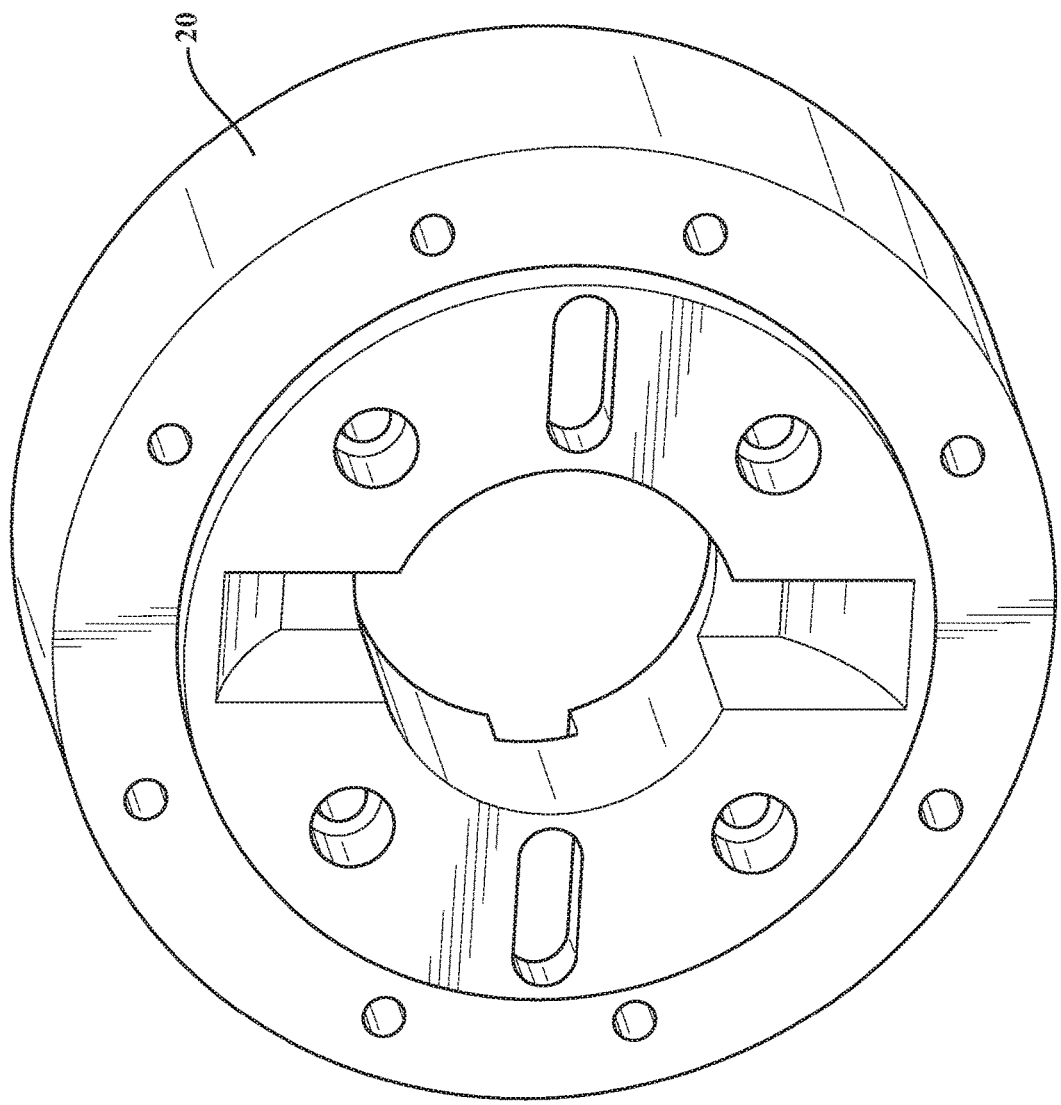
FIG. 7 is a perspective view of the plate in the head structure that mounts the head to a rotatable sleeve.
Figure 8:
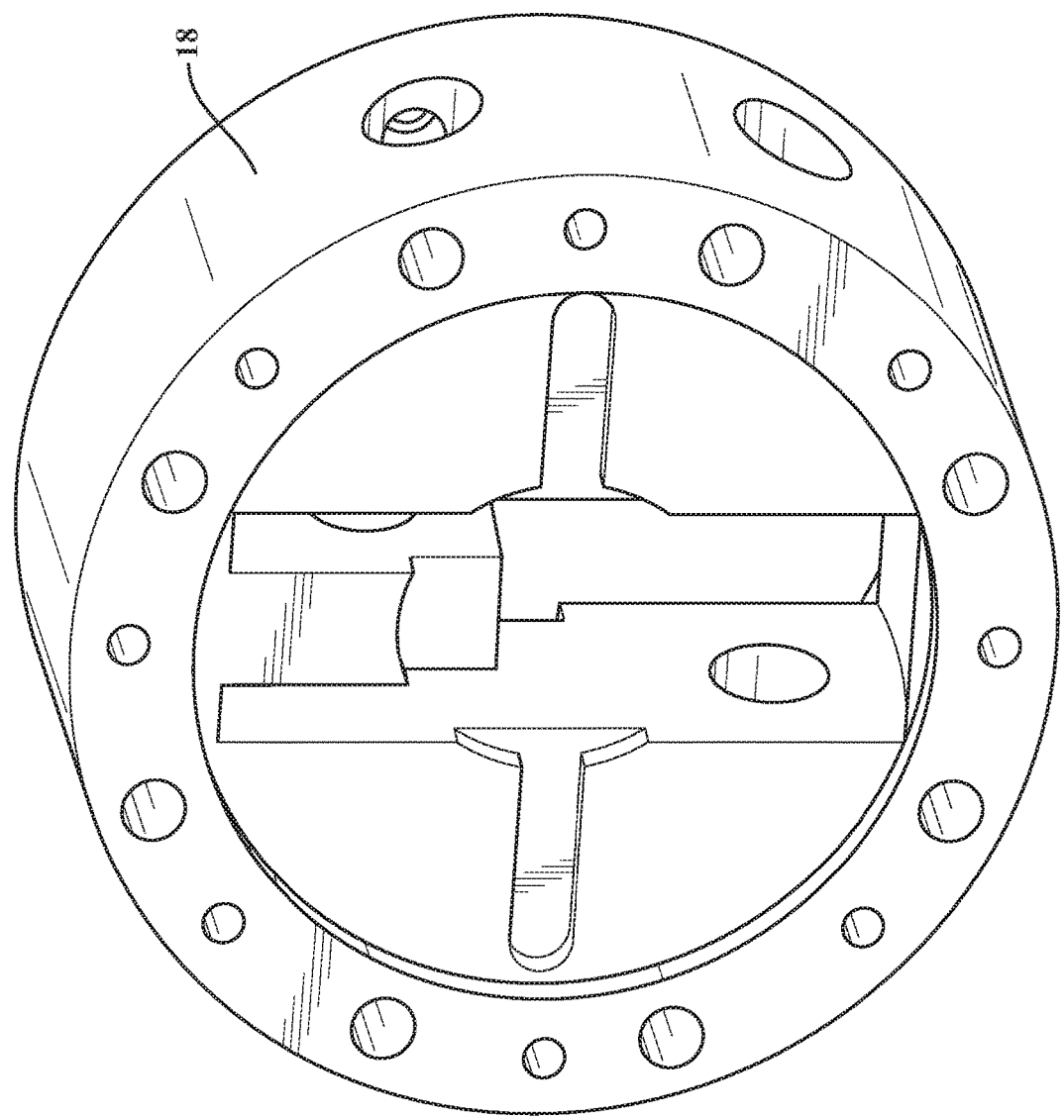
FIG. 8 is a perspective view of the intermediate plate in the exploded view of FIG. 5.
Figure 11C:
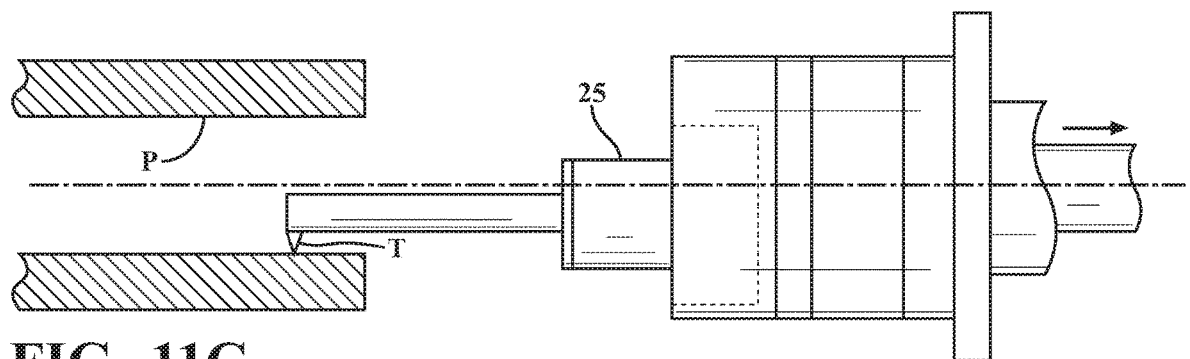

FIG. 4, on the other hand, shows the spindle 16 advanced to the right relative to the sleeve 12 so as to rotate the yoke 42 counter-clockwise thus causing the slide 24 to move down in the track 23 as shown in FIG. 4. This places the cutting tool in the maximum radius position; i.e., the position in which the tool removes the largest amount of material from the part P being contoured, as shown in FIG. 11C.

It will be understood by those skilled in the art that a numerical control system can move the spindle to any and all positions between the maximum and minimum radial positions shown in the figures thereby to achieve gradual changes in the interior diameter of a part being contoured.

A further feature of the head 10 is an air tube 70 is mounted to extend through and along the longitudinal axis of the spindle 16 and the yoke 42, as well as the slide 24 for the purpose of blowing chips and other debris out of the bore as a contouring operation is being carried out.

Also shown in FIG. 1 is a further feature of the head 10 in the form of a cover 72 having a thin metal cylindrical skirt 74 which fits into a cylindrical recess machined into the outer surface of the slide plate 22. The cover 72 abuts a circular shoulder in the slide plate shown in FIG. 6. Cover 72 has an oblong aperture 78 to accommodate slide movement.

OPERATION

In operation, the contouring head 10 is aligned with the internal bore to be contoured and the power systems necessary to rotate the head 10 and control the axial position of spindle 16 are energized. The tool enters the part and the longitudinal spindle position is adjusted according to the desired NC program to rotate the yoke 42 and move the slide 24 in the slide track 23 so as to control the radial position of the tool as it advances axially through the part. Air is blown through hose 70 to clear chips during a contouring operation.

It is to be understood that my invention has been described herein with respect to an illustrative embodiment and that various changes to sizes, proportions, and individual components can be made without departing from the spirit and scope of the appended claims.

What is claimed is:

1. A contouring apparatus for use in controlling a radial position of a cutting tool that rotates within and about a longitudinal axis of a bore, comprising:
   a spindle having a longitudinal axis of rotation and adapted for controlled bi-directional movement along the longitudinal axis of rotation;
   a slide plate mounted for rotation with the spindle and having a slide track formed therein and arranged perpendicular to the longitudinal axis of rotation;
   a slide disposed in the slide track for movement perpendicular to the longitudinal axis of rotation and configured to carry a post on a front face thereof;
   a pair of keeper plates mounted to the slide plate to maintain the slide between the pair of keeper plates and the slide plate;
   a first set of roller bearings disposed between the slide and the slide plate and a second set of roller bearings disposed between the keeper plates and the slide, wherein the first and second sets of roller bearings permit low friction movement of the slide relative to the slide plate;
   a yoke pivotally connected between the spindle and the slide to convert axial movement of the spindle relative to a sleeve into radial movement of the slide along the slide track and perpendicular to the longitudinal axis of rotation, wherein the yoke includes a pair of triangular plates; and a tool mount, wherein the slide is adapted to receive the tool mount therein such that a tool carried by the tool mount is subject to radial movement with the slide under control of a longitudinal position of the spindle.

2. The contouring apparatus of claim 1, wherein the tool mount is a pot.

3. The contouring apparatus of claim 1, wherein the first set of bearings are linear recirculating roller bearings.

4. The contouring apparatus of claim 1, wherein the second set of bearings includes V-shaped grooves in the front faces of the slide and a pair of V-shaped projections on interior faces of the keeper plates and fitting into the V-shaped grooves, the set of bearings being operatively disposed between the pair of V-shaped projections and the V-shaped grooves.

5. The contouring apparatus of claim 1, wherein tension of the first and second sets of roller bearings is adjustable.

6. The contouring apparatus of claim 1, furthering comprising:
   a cover configured to be mounted over said keeper plates; and
   a cylindrical skirt adapted to be mounted in surrounding contact to an outer surface of the slide plate, and an oval-shaped opening to accommodate radial movement of the slide and a pot.

7. A contouring head for contouring an inner surface of a bore comprising:
   a spindle having a longitudinal axis adapted to carry a cutting tool configured to contour the bore;
   a slide mount;
   a slide disposed in the slide mount and supported by roller bearings for movement at right angles relative to the longitudinal axis;
   a yoke pivotally connected between the spindle and the slide to convert axial movement of the spindle relative to a sleeve into radial movement of the slide along a slide track and perpendicular to the longitudinal axis, wherein the yoke includes a pair of triangular plates with three corners, wherein the pair of triangular plates are configured to pivot between an anchor plate, the spindle, and the slide at a first corner of the triangular plates; and
   keeper plates carried by the slide mount and overlying the slide to hold the slide to the slide mount;
   wherein the roller bearings are disposed between the keeper plates and the slide; and
   the slide is configured to move in response to movement of the spindle along the longitudinal axis.

8. The contouring head of claim 7, further comprising:
   a tool mount, wherein the slide is adapted to receive the tool mount therein such that a tool carried by the tool mount is subject to radial movement with the slide under control of a longitudinal position of the spindle.

9. The contouring head of claim 8, further comprising:
   an air hose connected through the spindle and the slide plate to provide air under pressure to the tool mount to clear debris during a contouring operation.

10. The contouring head of claim 7, wherein the roller bearings are linear recirculating roller bearings.

11. The contouring head of claim 7, further including a cover configured to be mounted over the keeper plates and having a cylindrical skirt adapted to be mounted in surrounding contact to an outer surface of the slide plate, and an oval-shaped opening to accommodate radial movement of the slide and a pot.

12. The contouring apparatus of claim 7, wherein the yoke includes a slot at a second corner of the pair of triangular plates, wherein the slot provides a lost motion connection for sliding movement between the yoke and a slide connector as the yoke rotates.

13. The contouring apparatus of claim 7, wherein the pair of triangular plates includes a second pivot connection at a second corner of the pair of triangular plates and are connected to the spindle; and
   wherein the pair of triangular plates includes a third pivot connection at a third corner of the pair of triangular plates and are connected to the slide connector.

14. The contouring apparatus of claim 1, further comprising an air hose connected through the spindle and the slide plate to provide air under pressure to the tool mount to clear debris during a contouring operation.

15. The contouring apparatus of claim 1, wherein the pair of triangular plates includes a first pivot connection at a first corner of the pair of triangular plates, and wherein the pair of triangular plates are connected to an anchor plate.

16. The contouring apparatus of claim 1, wherein the pair of triangular plates includes a second pivot connection at a second corner of the pair of triangular plates, and wherein the pair of triangular plates are connected to the spindle; and
   wherein the pair of triangular plates includes a third pivot connection at a third corner of the pair of triangular plates and are connected to the slide connector.

17. The contouring apparatus of claim 16, wherein the second pivot connection and a third pivot connection provide lost motion connections.

18. A contouring apparatus for use in controlling a radial position of a cutting tool that rotates within and about a longitudinal axis of a bore, comprising:
   a spindle having a longitudinal axis of rotation and adapted for controlled bi-directional movement along the longitudinal axis of rotation;
   a slide plate mounted for rotation with the spindle and having a slide track formed therein and arranged perpendicular to the longitudinal axis of rotation;
   a slide disposed in the slide track for movement perpendicular to the longitudinal axis of rotation and configured to carry a post on a front face thereof;
   a pair of keeper plates mounted to the slide plate to maintain the slide between the pair of keeper plates and the slide plate;
   a first set of roller bearings disposed between the slide and the slide plate and a second set of roller bearings disposed between the keeper plates and the slide, wherein the first and second sets of roller bearings permit low friction movement of the slide relative to the slide plate, and wherein the second set of bearings includes V-shaped grooves in the front faces of the slide and a pair of V-shaped projections on interior faces of the keeper plates and fitting into the V-shaped grooves, the set of bearings being operatively disposed between the pair of V-shaped projections and the V-shaped grooves;
   a yoke pivotally connected between the spindle and the slide to convert axial movement of the spindle relative to a sleeve into radial movement of the slide along the slide track and perpendicular to the longitudinal axis of rotation; and
   a tool mount, wherein the slide is adapted to receive the tool mount therein such that a tool carried by the tool mount is subject to radial movement with the slide under control of a longitudinal position of the spindle.

* * * * *